United States Patent Office 2,883,308

Patented Apr. 21, 1959

2,883,308

ETHOXYLINE - CYANURATE - ACRYLATE RESINOUS COMPOSITION AND COPPER CONDUCTOR COATED THEREWITH

Donald A. Yamada, Los Angeles, Irving Katz, Long Beach, and Jardine C. Wilson, Compton, Calif., assignors to North American Aviation, Inc.

No Drawing. Application April 2, 1956
Serial No. 575,365

13 Claims. (Cl. 117—232)

This invention relates to a polymerizable composition of matter. More particularly, this invention relates to a polymerizable composition which is useful as a molding composition and for encapsulating electrical apparatus.

Various resins have been suggested for use as encapsulating or potting compositions. Among these have been the ethoxyline resins and alkyd resins. One shortcoming of prior art resins is their relatively high viscosity. Consequently, when using such resins for encapsulating electrical units such as electrical coils, the resin does not penetrate into all the minute internal spacings between the coils of wire. Hence, upon curing, small spaces are left void of insulating material providing points of weakness at which high voltage breakdowns occur. To overcome this shortcoming, it has been proposed to add a solvent to the resin in order to obtain a solution of low viscosity prior to curing. This, however, has also led to difficulty since, upon subjecting the resin to a curing temperature, small amounts of solvent are trapped in pockets in the solidified resin. These solvent pockets, likewise, form weak points through which high voltage discharges occur, ruining the entire unit. The problem, therefore, is to obtain a resin composition which has a low enough viscosity to penetrate into all finite spaces in between numerous turns of copper wire in electrical coils, etc., and which, upon curing, will result in a hard insulating composition providing the utmost protection against high voltage breakdown.

It is therefore an object of the present invention to provide a polymerizable fluid composition of matter which has a very low viscosity prior to curing.

It is also an object of this invention to provide a polymerizable composition of matter suited for use as molding compositions and for encapsulating electrical apparatus.

It is likewise an object of this invention to provide a resin composition which has a low viscosity at 25° C. without requiring the use of solvents.

Another object of this invention is to provide a resinous fluid encapsulating composition whose polymerization is catalyzed by copper.

Still another object of this invention is to provide a plastic composition which has a high impact strength.

Another object is to provide electrical units insulated with a composition which is resistant to high potential breakdown.

Other objects of this invention will become more apparent from the discussion which follows.

The above and other objects of this invention are accomplished by providing a polymerizable fluid composition of matter comprising (1) a glycidyl polyether derivative of a polyhydric organic compound having a 1,2-epoxy equivalent greater than 1.0, (2) an organic ester of an unsaturated carboxy acid, and (3) a monohydric olifinic alcohol ester of cyanuric acid wherein the part of said ester derived from said olefinic alcohol contains only hydrocarbon radicals therein. For example, the polymerizable fluid composition may comprise (1) a glycidyl polyether derivative of a polyhydric phenol having a 1,2-epoxy equivalency of between 1.0 and 2.0, (2) a saturated eliphatic ether alcohol ester of an α-β unsaturated organic carboxylic acid, and (3) a monohydric olefinic alcohol ester of cyanuric acid wherein the part of said ester derived from said olefinic alcohol contains only hydrocarbon radicals therein.

In one embodiment, the composition of this invention comprises (1) a glycidyl polyester of 1,2,3-trihydroxypropane having a viscosity of about 150 centipoises at 25° C. and an epoxide equivalent of 140–165 grams of resin per gram equivalent of epoxide, (2) a saturated aliphatic ether alcohol ester of an α-β ethylenically unsaturated organic carboxylic acid wherein the portion of the molecule derived from the acid has from 3 to about 8 carbon atoms and wherein the esterifying ether alcohol part of the ester has from 3 to about 12 carbon atoms and contains at least one $$-\overset{|}{\underset{|}{C}}-O-\overset{|}{\underset{|}{C}}-$$

ether linkage, and (3) a monohydric olefinic alcohol triester of cyanuric acid in which the unsaturated esterifying alcohol groups have at least one carbon-to-carbon double bond and have from 3 to about 18 carbon atoms and contain only hydrocarbon radicals therein.

The first component used in the composition of this invention, namely, the glycidyl polyether resin, is prepared by reacting a polyhydric alcohol with an epihalohydrin in the presence of either a base or an acid. For example, this type of resin is prepared by reacting a mol of dihydric phenol such as 2,2-bis(4-hydroxyphenyl)propane with one or more mols of epichlorohydrin, in the presence of a base such as sodium hydroxide. The resin may also be prepared by reacting one mol of 1,2,3-trihydroxypropane with one or more mols of epichlorohydrin in the presence of an acid such as boron trifluoride or its derivatives. These glycidyl ether resins and methods for their preparation are described in various technical publications. Various patents also refer to these epoxy resins and to their preparation. Among the patents, for example, are the Castan Patents 2,324,483 and 3,344,333. The product that is obtained my be represented by the formula

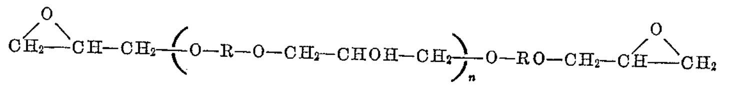

wherein R represents a divalent hydrocarbon of polyhydroxy substituted hydrocarbon such as a dihydric phenol or glycol, and $n$ is an integer of the series 0, 1, 2, 3, etc. The length of the molecule depends on the proportion of epichlorohydrin to polyhydric alcohol used. In general, these glycidyl ethers have an epoxy equivalency greater than 1.0 and contain terminal 1,2-epoxy groups. By the epoxy equivalency is meant the number of 1,2-epoxy groups contained in the average molecule of the glycidyl ether. Since the measured molecular weight of the mixture, upon which the epoxy equivalency is dependent, is the average molecular weight, the epoxy equivalency will not necessarily be 2.0 but will be between 1.0 and 2.0.

When the polyhydric alcohols employed in the preparation of the glycidyl polyethers are dihydric phenols they can be one or more phenols having from 1 to about 2 aromatic nuclei in the molecule such as resorcinol, catechol, hydroquinone, ethyl resorcinol, 2,2-bis(4-hydroxyphenyl) propane, bis(4-hydroxyphenyl)methane, bisphenol, 2,2-bis (4-hydroxyphenyl)butane, 1,5-dihydroxynaphthalene, etc. When the polyhydric alcohols employed are nonaromatic, they can be alcohols having from 2 to about 20 carbon atoms and from 2 to about 3 hydroxy groups. Nonlimiting examples of such alcohols are 1,2-dihydroxyethane, 1,2,3-trihydroxypropane, 1,8-dihydroxyoctane, 1,3,5-trihydroxy-dodecane, 1,2-dihydroxyeicosane. When preparing the polyether compounds, one or more of the alcohols can be employed including mixtures of aliphatic alcohols and phenols.

The second component of the polymerizable composition consists of the organic esters of α-β unsaturated carboxy acids in which the α carbon atom is attached to the carbon of the

group in the organic acid. The esters are prepared by esterifying an α-β unsaturated mono or polycarboxylic organic acid with an appropriate alcohol. Thus, the esters have at least one

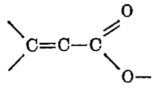

group in the molecule. The part of the ester derived from the α-β unsaturated acids, can have from 3 to about 8 carbon atoms and can have from 1 to 2 carboxy, —COO—, groups. The part of the ester derived from the esterifying alcohol, can have from 2 to about 12 carbon atoms and from 0 to about 5 oxygen atoms. Thus, the molecule as a whole has from 4 to about 20 carbon atoms and from 2 to about 9 oxygen atoms.

Preferred esters of α-β unsaturated carboxylic acids are those formed by the use of esterifying saturated aliphatic ether alcohols. Nonlimiting examples of such esters are ethoxyethylacrylate, butoxyethylmethacrylate, methoxyethyl-2-pentenoate, tetraethyleneglycoldimethylacrylate, the triethyleneglycol ester of diethylacrylic acid, hexaethyleneglycol-2-octenoate, diethylene glycol fumarate, hexaethyleneglycol-2-octenedioate, etc.

Thus, it is seen that the esters of α-β unsaturated organic acids can have 3 to 8 carbons in the acid portion of the molecule and 1 to 12 carbons in the esterifying alcohol part of the molecule. The preferred esters are those obtained by the use of saturated aliphatic ether alcohols as esterifying alcohols having at least one

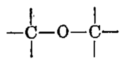

ether group. Hence, in the preferred embodiment of the organic ester the esterifying alcohol part of the molecule will have from 3 to about 12 carbons and from 1 to about 5 oxygen atoms. Accordingly, the preferred acrylic type esters will have a total of from 6 to about 20 carbon atoms and from 3 to about 9 oxygen atoms.

The third component of the composition of this invention consists of esters of cyanuric acid which are prepared by reacting a cynanuric halide with an alcohol in the presence of a hydrohalide acceptor. An example is the reaction of cyanuric chloride with allyl alcohol in the presence of sodium hydroxide to give the allyl ester of cyanuric acid. Methods of preparation are described in the Dudley Patent 2,510,564. The esters of cyanuric acid have the general formula

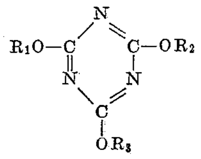

wherein $R_1$ and $R_2$ can be the same or different and can be hydrogen and/or saturated and unsaturated aliphatic hydrocarbon groups having from 1 to about 18 carbon atoms and $R_3$ is an unsaturated hydrocarbon group having carbon-to-carbon double bonds and having from 3 to about 18 carbon atoms. Nonlimiting examples of cyanuric esters which are used include: allylcyanurate, allyl methyl cyanurate, methyl ethyl allyl cyanurate, di(propallyl)cyanurate, methyl di(2-butenyl)cyanurate, 3-butenyl 3-methyl-2-butenyl octenyl cyanurate, triallylcyanurate, trimethallylcyanurate, triethallylcyanurate, allyl cyclohexyl oleyl cyanurate, tri(2-octenyl)cyanurate, trioleyl cyanurate.

A preferred embodiment of this invention comprises a composition in which the cyanurates are those having at least two carbon-to-carbon unsaturated monohydric olefinic alcohol ester groups on the cyanuric acid. In other words, in the preferred embodiment $R_2$ and $R_3$ of the general formula for the cyanuric acid ester are ethylenically unsaturated hydrocarbon groups having from about 3 to about 18 carbon atoms. The compounds of this invention containing the preferred cyanuric acid esters readily polymerize upon treatment at elevated temperatures to polymers having good insulating qualities for electrical purposes.

Especially preferred are cyanuric acid esters in which all the ester groups, namely, $R_1$, $R_2$ and $R_3$ are olefinically unsaturated hydrocarbon groups and each have from about 3 to about 6 carbon atoms. The total number of carbon atoms in the especially preferred ester will thus be from about 12 to about 21. When the cyanuric acid ester employed has this particular composition, it is found that impregnating materials are obtained which are less viscous and which, upon curing, form better insulating compositions.

The amounts in which the components are employed in the composition of this invention may be varied to some extent. For example, good polymers of high insulating quality are obtained when the polymerizable fluid composition comprises 100 parts by weight of (1) a glycidyl polyether of 1,2,3-trihydroxypropane having a viscosity of about 150 centipoises at 25° C. and an epoxide equivalency of between 140 and 165 grams resin per 1 gram equivalent of epoxide, (2) from about 50 to about 200 parts by weight of an alkyl ether ester of an α-β unsaturated organic carboxylic acid wherein the acid portion of the molecule has from 3 to about 8 carbon atoms and wherein the esterifying alkylether part of the ester has from 3 to about 12 carbon atoms and has at least one

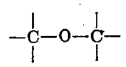

ether linkage, and (3) from about 5 to about 65 parts by weight of a monohydric olefinic alcohol triester of cyanuric acid in which the esterifying unsaturated alcohol groups contain only hydrocarbon radicals therein, have at least one carbon-to-carbon double bond and have from 3 to about 18 carbon atoms. The proportions in which the components were used above, apply to the components employed in this invention in general. Thus, 100 parts of the glycidyl polyether compound is employed with from about 50 to 200 parts of an ester of an α-β unsaturated carboxylic acid, together with from about 5 to about 65 parts of a monohydric olefinic alcohol ester of cyanuric acid, the proportions being given in parts by weight.

In general, the compositions of this invention have a very low viscosity and, therefore, required no solvent when used as impregnating compounds or insulating electrical units. The low viscosity permits the composition to penetrate all minute spaces in between turns of coiled wire in such units. Also, they have good stability and do not polymerize on standing for considerable periods of time at temperatures of up to about 50° C.

An advantage of the composition of this invention is that its polymerization is catalyzed by copper. This property is desirable when the mixture is used for encapsulating electrical apparatus, since any of the fluid coming in contact with exposed copper conductors will be sure to polymerize upon heating and thus insure a good insulating coating on such exposed surface. Copper catalyzation is particularly important when wire used in the electrical unit is covered with a thin coat of some insulating material. The thin insulating coat usually develops minute cracks in the process of winding electrical coils. The composition of this invention, when used to encapsulate the unit, penetrates these minute cracks where its polymerization is catalyzed by the copper surface in the curing process.

The compositions of this invention are prepared by adding the individual constituents in the proper proportions to a vessel and agitating the solution by suitable means such as stirring, etc., until a homogeneous composition results. The order of addition of the components is immaterial. An alternative method embodies mixing the unsaturated cyanuric acid ester with an ester of an $\alpha$-$\beta$ unsaturated organic carboxylic acid and if necessary partially heat-polymerizing the mixture until the acid number of the resulting composition is from about 20 to about 60 and has a viscosity varying from 4,000 to 7,000 centipoises. This cyanurate and unsaturated acid polyester mixture, which may be partially polymerized, is then added to the glycidyl polyether resin and additional amounts of esters of $\alpha$-$\beta$ unsaturated organic acids. Various compositions of this invention are illustrated by the following examples, in which the amounts are given in parts by weight.

*Example I*

To a vessel equipped with means for agitation were added 6 parts of a glycidyl polyether obtained by reacting epichlorohydrin with 1,2,3-trihydroxypropane having an epoxide equivalency of about 140–165 grams of resin per gram equivalent of epoxide and a viscosity of about 150 centipoises; 6 parts of tetraethyleneglycol dimethacrylate; and 2 parts of a mixture of equal parts of triallylcyanurate and diethylene glycol fumarate which has an acid number of about 30 and a viscosity of substantially 4500 centipoises at 25° C. The mixture was then subjected to stirring until a homogeneous liquid solution, called the prepolymer, resulted. This solution had a light-straw color and had a viscosity of substantially 60 centiposes. The composition was then poured into a mold measuring ½ in. x ½ in. x 4 in. and subjected to a temperature of 120° C. for a period of 16 hours. The composition polymerized under this treatment to a hard plastic material which, upon testing in a modified Gardner Laboratories, Paint Film Impact Testor, was found to have an impact strength of about 8 inch-pounds per ½ in. width.

When diethylene glycol maleate is substituted for diethylene glycol fumarate, substantially the same results are obtained. Likewise, equally good results are obtained when the diethylene glycol fumarate is replaced by diethylene glycol fumarate sebacate which is prepared by reacting together 4 mols diethylene glycol, 3 mols sebacic acid, and 1 mol of fumaric acid.

*Example II*

A polymerizable fluid composition was prepared in a manner similar to that of Example I comprising 3 parts of the glycidyl polyether used in Example I, 3 parts of butoxyethylacrylate, and 3 parts of a mixture of equal amounts of diethyleneglycol fumarate and triallylcyanurate having an acid number of substantially 25 and a viscosity of substantially 6500 centipoises at 25° C. The mixture after agitation resulted in a clear, straw-colored, liquid prepolymer solution having a viscosity of substanntially 42 centipoises at 25° C. The composition was poured into a mold as in Example I and subjected to a temperature of substantially 120° C. for a period of 16 hours which caused the composition to polymerize to a solid plastic composition.

*Example III*

To a reaction vessel is added 100 parts of a polyether resin obtained by the copolymerization of 2,2-bis-(4-hydroxphenyl)pentane with 1,2-epoxy-3-chloropropane having an epoxy equivalency of 175–210 grams of resin per epoxide equivalent, 200 parts of hexaethyleneglycol-2-octenoate, and 65 parts of trioleylcyanurate. The mixture is thoroughly stirred to produce a polymerizable fluid composition.

In like manner, a polymerizable composition is prepared comprising 1 part of a glycidyl polyether obtained by the reaction of 2,2-bis(4-hydroxyphenyl)propane with 1,2-epoxy-3-chloropropane, 1 part of methoxyethyl-2-butenoate, 1 part of hexaethyleneglycol 2-octenedioate, and 1 part of 1-ethyl-3,5-didodecenylcyanurate.

In order to accelerate the curing at elevated temperatures, a catalyst may be added to the polymerizable compositions. Preferably the catalyst should be of a kind that will not cause polymerization at low temperatures. One catalyst of this kind is a mixture of an amide and an amine such as, for example, the mixture consisting of dimethylformamide and 1-cyanoguanidine. The amide is preferably an amide of a monocarboxy acid having a total of from 1 to about 15 carbon atoms and 1 nitrogen atom. The amine is a carbon, hydrogen, and nitrogen containing compound having from 3 to about 24 carbon atoms, 1 to about 5 nitrogen atoms, and from 0 to about 3 oxygen atoms. It is found that when such a catalyst composition is employed together with the polymerizable fluid compositions of this invention, the mixture remains stable for extended periods of time at conventional storage temperatures, and is readily cured at temperatures of substantially 93 to 150° C., to form rigid plastic compositions of high insulating quality.

The ratio of the amounts of amide-to-amine in parts by weight which can be employed in the catalyst can vary from about 16:1 to about 3:1, preferably from about 11:1 to about 5:1. The amount of the catalyst used can vary from 0.5 to about 30 weight percent based on the total amount of resin catalyzed. The use of the catalyst having this composition permits the polymerizable fluid of this invention to maintain a low viscosity at temperatures of up to 50° C. while enhancing the curing or polymerization reactions at elevated temperatures.

Examples of amides which are found useful as catalyst components are: formamide, N-methylformamide, N,N-dimethylformamide, N-phenylformamide, N,N-dimethylacetamide, N,N-di-t-butylpropionamide, etc. Examples of primary, secondary and tertiary amines that can be used are: butylamine, N-ethylpropylamine, triethylamine, tributylamine, phenylenediamine, dimethyldiaminobenzene, 1-cyanoguanidine, 1-cyano-2-hexylguanidine, and the like. Examples of oxygen containing amines are the ethanolamines, butenolamine, tripentanolamine, etc.

The catalysts may be composed of one or more of the amides with one or more of the amines in the proportions named above. Examples of catalyst compositions employed, in which the proportions are given in parts by weight, are: 7 parts N,N-diethylacetamide and 1 part diphenylamine; 3 parts N-methylformamide and 1 part trihexylamine; 5 parts N,N-dipropylacetamide and 1 part 1-cyanoguanidine; 20 parts formamide, 1 part diethylene amine and 1 part of triethanolamine; 8 parts N-ethylformamide and 1 part eicosylamine; 10 parts N,N-diphenylformamide and 1 part metaphenylenediamine; 2 parts N,N-dimethylformamide and 1 part methylene dianiline; etc.

Peroxide catalysts may also be added to the amide-amine catalysts mentioned above. The peroxide catalysts are of the organic peroxide type as, for example, cumene hydroperoxide, benzoyl peroxide, methyl ethyl ketone peroxide, etc.

Examples of the compositions of this invention containing the catalyst or catalysts are as follows:

*Example IV*

To 100 parts of the liquid prepolymer composition of Example I were added 4.5 parts of dimethylformamide and 0.4 part of 1-cyanoguanidine. After stirring until a homogeneous mixture resulted, the solution was allowed to remain at a conventional storage temperature of about 25° C. for a period of 22 days during which time the viscosity remained at substantially 50 centipoises.

Similar results were obtained when 0.5 part of cumene hydroperoxide was added to the composition of Example IV. When the composition containing the cumene hydroperoxide catalyst was polymerized and tested as in Example I, it was found to have an impact strength of 12 inch-pounds per ½ in. width. When the amide and amine catalyst in the latter composition were increased to 4.9 parts and 0.8 part, respectively, the impact strength was found to be increased to 24 inch-pounds per ½ in. width. The improved impact strength which is obtained illustrates the advantage of employing the amide-amine catalyst together with the compositions of this invention.

Other catalyzed compositions were prepared to give room-temperature stable encapsulating resins as follows: 100 parts of the prepolymer composition of Example I, together with 0.5 part of a composition obtained by mixing 5 parts N,N-dipropylacetamide with 1 part of 1-cyanoguanidine; 100 parts of the prepolymer composition of Example II, together with 3 parts of a catalyst obtained by mixing 5 parts of N,N-diethylformamide and 1 part of didodecylamine; 100 parts of the composition of Example III with 15 parts of the catalyst obtained by mixing 2 parts N,N-dimethylformamide with 1 part methylenedianaline; 100 parts of the composition of Example IV, together with 20 parts of a catalyst obtained by mixing 11 parts N,N-dimethylformamide, 1 part diphenylamine and 0.5 part of benzoyl peroxide.

As stated previously, the polymerizable composition of this invention maintains a very low viscosity for relatively long periods of time at conventional storage temperatures. This permits the use of the composition for applying insulating coatings to electrical equipment by dipping technique without the fear of having the composition set up before being utilized. For example, a composition made up of equal parts of the glycidyl polyether of 1,2,3-trihydroxypropane, tetraethyleneglycol dimethacrylate, diethyleneglycol fumarate and triallylcyanurate, increased from an original viscosity of 100 centipoises to only 150 centipoises after 15 days' storage at substantially 25° C. In like manner, the composition consisting of equal parts of glycidyl polyether of 1,2,3-trihydroxypropane, butoxyethylacrylate, diethyleneglycol fumarate and triallylcyanurate increased from an initial viscosity of 60 centipoises to 112 centipoises after 5 days' storage at substantially 25° C., and to 132 centipoises after 10 days' storage at this temperature.

The following examples illustrate the effect of copper in the curing procedure of the compositions of this invention.

*Example V*

To a vessel were added 10 parts of the glycidyl polyether used in Example I, 10 parts of butoxy ethyl acrylate, 5 parts of diethylene glycol fumarate and 5 parts of triallylcyanurate and the contents agitated by means of stirring until a homogeneous composition resulted. To this resin composition was added 4.5 parts of a 50–50 mixture of copper shot and copper powder. The vessel and contents were then subjected to a temperature of 121° C. for a period of 16 hours. Under this treatment the composition set into a hard plastic.

When the procedure of Example V was repeated, with the presence of 0.5 weight percent of cumene hydroperoxide, the curing time was reduced to 6 hours.

When a copper foil was dipped into the composition of Example V minus the copper shot and powder, and then subjected to a temperature of 121° C. for a period of 16 hours, a uniform smooth hard film formed on the surface of the foil. When 0.5 weight percent of cumen hydroperoxide, based on the total amount of resinous material, is added as a catalyst to the composition, the curing time is reduced to 6 hours with an equally good film being obtained.

*Example VI*

The procedure of Example V was repeated with the absence of the triallylcyanurate. Upon curing for 20 hours at a temperature of 121° C., the composition only partially set in that it did not form a hard plastic material. Also, there was partial separation of the components of the mixture.

Example VI indicates that the glycidyl ether resin and the ester of the $\alpha$-$\beta$ unsaturated acids are not compatible under the conditions the composition is subjected to. With the addition of 0.5 weight percent of hydroperoxide catalyst to the composition of Example VI the results were essentially the same, namely, the components tended to separate into layers. Thus, it is seen that a major advantage of the compositions of the present invention is that they form a novel plastic composition which is fully compatible and suitable for forming insulation coatings at elevated temperatures.

The compositions of this invention are useful for insulating electrical copper conductors. The compositions are applied to the copper surface by any suitable means such as spraying, brushing, or immersing the copper electrical unit in the fluid composition. Excess insulating fluid may be allowed to drain off, and the unit, with a coating of the composition of this invention on the surfaces which are to be insulated, is then subjected to curing at elevated temperatures of from about 93° C. to about 150° C., for a period of from 1 to 20 hours. This results in a hard plastic insulating film being formed on the coated surfaces. Alternatively, the electrical unit may be immersed in a container filled with the composition of this invention and the container, together with the fluid and electrical unit, subjected to curing temperatures so as to form an electrical unit which is completely encapsulated in a plastic material of this invention. The following examples illustrate the methods used when employing the compositions for this purpose.

*Example VII*

An electrical coil containing a plurality of turns of copper wire was completely immersed in the prepolymer fluid composition of Example I. The vessel and immersed coil were then placed in a vacuum apparatus and the air removed, creating a partial vacuum in the system. This expelled any air trapped in the coil. Air at atmospheric pressure was then admitted to the apparatus, thus enabling the low viscosity resin to penetrate all spaces in between the coils of wire so as to completely cover all interior surfaces. The electrical coil was removed from the resin solution, placed in an oven and subjected to a temperature of substantially 120° C. for a period of about 12 hours. A thin, hard film was formed on the surface of the copper wire as the resin set at the elevated temperatures. Units insulated with this composition withstand high potentials across the wire and the core of the unit without breakdown.

*Example VIII*

The procedure of Example VII was repeated except that the wound unit and the resin composition were first placed in the high vacuum apparatus and the air removed prior to immersion of the electrical unit in the resin. When this procedure is followed, there is less danger of trapping air in small pockets in the electrical unit and complete impregnation of the entire coil is facilitated.

*Example IX*

An electrical coil consisting of a plurality of turns of copper wire was immersed in a resin under vacuum as described in Example VIII. The resin was placed in a container which was to serve as a casing for the finished unit. The casing, resin, and coil were then placed in an oven and subjected to a temperature of approximately 120° C. for a period of about 12 hours. The resin set into a hard material, forming an encapsulated electrical unit.

While in the above examples the use of the compositions of this invention has been illustrated as insulating materials for electrical units, there are many other uses to which they are applicable. Thus, the compositions can be employed as protective paints for metal surfaces, laminating plastics, and the like. In general, these compositions may be employed in any process wherein the resin is to be cured at elevated temperatures but where it is desirable to have a low viscosity composition which remains stable at room temperature for reasonable periods of time.

The compositions of this invention may also contain from 1 to 500 weight percent of one or more inorganic fillers such as alumina, silica, asbestos, titanium dioxide, zinc oxide, magnesium silicate, mica, calcium carbonate, glass beads, etc. The amount of filler is based on the amount of polymerizable composition used.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A polymerizable fluid composition of matter comprising (1) 100 parts by weight of an epoxide resin comprising a glycidyl polyether derivative of a polyhydroxy substituted hydrocarbon obtained by reacting epichlorohydrin with a polyhydroxy substituted hydrocarbon selected from the class consisting of polyhydric alcohols and polyhydric phenols, said resin having a 1,2-epoxy equivalency of between 1.0 and 2.0, (2) from about 50 to about 200 parts by weight of a saturated aliphatic ether alcohol ester of an α-β unsaturated olefinic carboxylic organic acid, and (3) from about 5 to about 65 parts by weight of a monohydric olefinic alcohol ester of cyanuric acid wherein the part of said ester derived from said olefinic alcohol contains only hydrocarbon radicals therein.

2. A polymerizable fluid composition of matter comprising (1) a glycidyl polyether resin obtained by reacting epichlorohydrin with 1,2,3-trihydroxypropane said resin having a 1,2-epoxy equivalency of substantially 140–165 grams of resin per gram equivalent of epoxide, (2) a saturated aliphatic ether alcohol ester of an α-β unsaturated olefinic carboxylic acid wherein the portion of said ester which is derived from said acid has from 3 to about 8 carbon atoms and wherein the esterifying ether alcohol part of said ester has from 3 to about 12 carbon atoms and contains at least one $$-\overset{|}{\underset{|}{C}}-O-\overset{|}{\underset{|}{C}}-$$

ether linkage, and (3) a monohydric olefinic alcohol triester of cyanuric acid in which each of the component parts of said ester derived from said olefinic alcohol has at least one carbon-to-carbon double bond and has from 3 to about 18 carbon atoms and contains only hydrocarbon radicals therein.

3. A polymerizable fluid composition of matter comprising (1) 100 parts by weight of a glycidyl polyether resin obtained by reacting epichlorohydrin with 1,2,3-trihydroxypropane said resin having a 1,2-epoxy equivalency of substantially 140–165 grams of resin per gram equivalent of epoxide, (2) from about 50 to 200 parts by weight of a saturated aliphatic ether alcohol ester of an α-β unsaturated olefinic carboxylic acid wherein the portion of said ester derived from the acid has from 3 to about 8 carbon atoms and wherein the esterifying ether alcohol part of said ester has from 3 to about 12 carbon atoms and has at least one $$-\overset{|}{\underset{|}{C}}-O-\overset{|}{\underset{|}{C}}-$$

ether linkage, and (3) from about 5 to about 65 parts by weight of a monohydric olefinic alcohol triester of cyanuric acid in which each of the component parts of said ester derived from said olefinic alcohol contains only hydrocarbon radicals therein, has at least one carbon-to-carbon double bond and has from 3 to about 18 carbon atoms.

4. A polymerizable fluid composition of matter comprising 100 parts by weight of (1) a glycidyl polyether resin obtained by reacting epichlorohydrin with 1,2,3-trihydroxypropane said resin having a 1,2-epoxy equivalency of substantially 140–165 grams of resin per gram equivalent of epoxide; (2) from about 50 to about 200 parts by weight of saturated aliphatic ether alcohol ester of an α-β unsaturated olefinic carboxylic acid wherein the portion of said ester which is derived from said acid has from 3 to about 8 carbon atoms and wherein the esterifying ether alcohol part of said ester has from 3 to about 12 carbon atoms and has at least one $$-\overset{|}{\underset{|}{C}}-O-\overset{|}{\underset{|}{C}}-$$

ether linkage; (3) from about 5 to about 65 parts by weight of a monohydric olefinic alcohol triester of cyanuric acid in which each of the component parts of said ester derived from said olefinic alcohol contains only hydrocarbon radicals therein, has at least one carbon-to-carbon double bond and has from 3 to about 18 carbon atoms; together with from about 10 to about 50 parts by weight of a polymerization catalyst composition comprising (4) an amide of a monocarboxy organic acid having from 1 to about 15 carbon atoms and 1 nitrogen atom and (5) a carbon, hydrogen and nitrogen containing amine having from 2 to about 24 carbon atoms and from 1 to about 3 nitrogen atoms.

5. A polymerizable fluid composition of matter comprising 100 parts by weight of (1) a glycidyl polyether resin obtained by reacting epichlorohydrin with 1,2,3-trihydroxypropane said resin having a 1,2-epoxy equivalency of substantially 140–165 grams of resin per gram equivalent of epoxide; (2) from about 50 to about 200 parts by weight of a saturated aliphatic ether alcohol ester of an α-β unsaturated olefinic carboxylic acid wherein the portion of said ester which is derived from said acid has from 3 to about 8 carbon atoms and wherein the esterifying ether alcohol part of said ester has from 3 to about 12 carbon atoms and has at least one $$-\overset{|}{\underset{|}{C}}-O-\overset{|}{\underset{|}{C}}-$$

ether linkage; (3) from about 5 to about 65 parts by weight of a monohydric olefinic alcohol triester of cyanuric acid in which each of the component parts of said ester derived from said olefinic alcohol contains only hydrocarbon radicals therein, has at least one carbon-to-carbon double bond and has from 3 to about 18 carbon atoms; together with from about 10 to about 50 parts by weight of a polymerization catalyst composition comprising (4) an amide of a monocarboxy organic acid having from 1 to about 15 carbon atoms and 1 nitrogen atom and (5) a carbon, hydrogen and nitrogen containing amine having from 2 to about 24 carbon atoms and from 1 to about 3 nitrogen atoms, wherein the ratio of the parts by weight of amide-to-amine is from about 11:1 to 5:1.

6. A polymerizable fluid composition of matter comprising (1) 100 parts by weight of a glycidyl polyether resin obtained by reacting epichlorohydrin with 1,2,3-trihydroxypropane said resin having a 1,2-epoxy equivalency of substantially 140–165 grams of resin per gram equivalent of epoxide; (2) from about 50 to about 200 parts by weight of tetraethylene glycol dimethacrylate; (3) from about 5 to about 65 parts of diethyleneglycol fumarate; and (4) from about 10 to about 65 parts by weight of triallyl cyanurate.

7. A polymerizable fluid composition of matter comprising (1) 6 parts by weight of a glycidyl polyether resin obtained by reacting epichlorohydrin with 1,2,3-trihydroxypropane said resin having a 1,2-epoxy equivalency of substantially 140–165 grams of resin per gram equivalent of epoxide; (2) about 6 parts by weight of tetraethylene glycol dimethacrylate; and (3) about 1 part by weight of diethyleneglycol fumarate; and (4) about 1 part of triallyl cyanurate.

8. A polymerizable fluid composition of matter comprising substantially (1) 100 parts by weight of a glycidyl polyether resin obtained by reacting epichlorohydrin with 1,2,3-trihydroxypropane said resin having a 1,2-epoxy equivalency of substantially 140–165 grams of resin per gram equivalent of epoxide; (2) 100 parts by weight of tetraethylene glycol dimethacrylate; (3) 16.5 parts by weight of diethyleneglycol fumarate; (4) 16.5 parts by weight of triallyl cyanurate; (5) 4.5 parts by weight of dimethylformamide; and (6) 0.4 part by weight of 1-cyanoguanidine.

9. The composition of claim 8 containing about 1.3 parts by weight of cumene hydroperoxide.

10. A process for insulating electrical copper conductors with a composition consisting of (1) 100 parts by weight of a glycidyl polyether resin obtained by reacting epichlorohydrin with a polyhydroxy substituted hydrocarbon having a 1,2-epoxy equivalency of between 1.0 and 2.0, (2) from about 50 to about 200 parts by weight of a saturated aliphatic ether alcohol ester of an $\alpha$-$\beta$ unsaturated olefinic carboxylic organic acid and (3) from about 5 to about 65 parts by weight of a monohydric olefinic alcohol ester of cyanuric acid in which each of the component parts of said ester derived from said olefinic alcohol contains only hydrocarbon radicals therein, has at least one carbon-to-carbon double bond and has from about 3 to about 18 carbon atoms, comprising immersing said copper conductor in said composition in order to form a protective coating of said composition in intimate contact with said copper conductor, removing said copper conductor from said composition and subjecting said coated copper conductor to a curing temperature of substantially 93° C.–150° C.

11. A process for insulating electrical copper conductors with a composition consisting essentially of (1) 100 parts by weight of a glycidyl polyether resin obtained by reacting epichlorohydrin with 1,2,3-trihydroxypropane, said resin having a 1,2-epoxy equivalency of substantially 140–165 grams of resin per gram equivalent of epoxide, (2) from about 50 to about 200 parts by weight of a saturated aliphatic ether alcohol ester of an $\alpha$-$\beta$ unsaturated olefinic carboxylic acid wherein the portion of said ester derived from the acid has from 3 to about 8 carbon atoms and wherein the esterifying ether alcohol part of said ester has from 3 to about 12 carbon atoms and has at least one $$-\overset{|}{\underset{|}{C}}-O-\overset{|}{\underset{|}{C}}-$$

ether linkage, and (3) from about 5 to about 65 parts by weight of a monohydric olefinic alcohol triester of cyanuric acid in which each of the component parts of said ester derived from said olefinic alcohol contains only hydrocarbon radicals therein, has at least one carbon-to-carbon double bond and has from 3 to about 18 carbon atoms, comprising immersing said copper conductor in said composition in order to form a protective coating of said composition in intimate contact with said copper conductor and subjecting said coated copper conductor to a curing temperature of substantially 93° C.–150° C.

12. A process for insulating electrical copper conductors with a composition consisting essentially of (1) two parts by weight of a glycidyl polyether resin obtained by reacting epichlorohydrin with 1,2,3-trihydroxypropane, said resin having a 1,2-epoxy equivalency of substantially 140–165 grams of resin per gram equivalent of epoxide, (2) two parts by weight butoxy ethyl acrylate, (3) one part by weight of diethylene glycol fumarate, (4) one part by weight of triallylcyanurate, comprising immersing said copper conductor in said composition in order to form a protective coating of said composition in intimate contact with said copper conductor and subjecting said coated copper conductor to a curing temperature of substantially 93° C.–150° C.

13. The process of claim 12, wherein the composition contains in addition substantially 0.5 weight percent cumene hydroperoxide.

References Cited in the file of this patent

UNITED STATES PATENTS

| | | |
|---|---|---|
| 2,443,741 | Kropa | June 22, 1948 |
| 2,691,007 | Cas | Oct. 5, 1954 |
| 2,707,177 | Skiff et al. | Apr. 26, 1956 |

UNITED STATES PATENT OFFICE

CERTIFICATE OF CORRECTION

Patent No. 2,883,308

April 21, 1959

Donald A. Yamada et al.

It is hereby certified that error appears in the printed specification of the above numbered patent requiring correction and that the said Letters Patent should read as corrected below.

Column 1, line 72, for "equivalent" read -- equivalency --; column 2, line 14, for "polyester" read -- polyether --; line 48, for "3,344,333" read -- 2,344,333 --; same line 48, for "my" read -- may --; column 3, line 31, for "acids" read -- acid --; column 5, line 48, for "centiposes" read -- centipoises --; line 74, for "substanntially" read -- substantially -- column 7, line 47, before "dipping" insert -- a --.

Signed and sealed this 20th day of October 1959.

(SEAL)

Attest:

KARL H. AXLINE

Attesting Officer

ROBERT C. WATSON

Commissioner of Patents